United States Patent [19]

Wohlford

[11] 4,443,041
[45] Apr. 17, 1984

[54] TRACK LINK INCLUDING REMOVABLE SPROCKET-ENGAGING WEAR CAP

[75] Inventor: William P. Wohlford, Bettendorf, Iowa

[73] Assignee: Deere & Company, Moline, Ill.

[21] Appl. No.: 344,669

[22] Filed: Feb. 1, 1982

[51] Int. Cl.³ .............................................. B62D 55/28
[52] U.S. Cl. ........................................ 305/43; 305/53; 305/54
[58] Field of Search ....................... 305/14, 36, 39, 53, 305/54, 58 R, 57, 40, 60, 43; 198/850–853; 474/901

[56] References Cited

U.S. PATENT DOCUMENTS

| | | | |
|---|---|---|---|
| 2,375,170 | 5/1945 | McNeil | 305/36 |
| 3,063,758 | 11/1962 | Fikse | 305/40 |
| 4,114,467 | 9/1978 | Petershack | 305/57 X |
| 4,129,045 | 12/1978 | Kishitani | 305/58 R |

Primary Examiner—David A. Scherbel

[57] ABSTRACT

A track section of a track-laying tractor drive track includes a track link having a sprocket-engageable member defined by a base in the form of a generally semi-cylindrical bar and a wear cap removably received on the bar. The wear cap is in the form of a cylindrical segment having its opposite ends separated by more than 180 degrees and when mounted in place on the base, the opposite ends of the wear cap are respectively located in close proximity to a grouser removably secured to the track link and adapted to be located in close proximity to a grouser of an adjacent link whereby the wear cap is retained in position as long as the grousers are in position.

2 Claims, 2 Drawing Figures

TRACK LINK INCLUDING REMOVABLE SPROCKET-ENGAGING WEAR CAP

RELATED APPLICATION

This application discloses subject matter common with that disclosed in co-pending application Ser. No. 344,672, filed on an even date herewith.

BACKGROUND OF THE INVENTION

The present invention relates to drive tracks for tracklaying vehicles wherein flexors are used for interconnecting adjacent track sections and more particularly relates to track sections having replaceable wear portions for the links thereof.

Design proposals for providing replaceable wear caps or covers for the bushings of conventional track, having pin and bushing pivot connections between adjacent track sections, are known in the art. An example of such a proposal is disclosed in U.S. Pat. No. 4,129,045. In the patented proposal, the covers are generally C-shaped in cross section and are made of spring metal which permits the opposite ends of the covers to be deflected apart to permit the covers to be installed on or removed from their associated bushings. Additional elements or strucuture are provided solely for retaining the wear caps in place.

The patented proposal has the drawbacks of requiring the wear caps to be relatively thin, which reduces their wear life and of having additional cost associated with the retaining means for the wear caps.

SUMMARY OF THE INVENTION

According to the present invention, there is provided a track section including a sprocket-engaging member provided with a removable wear cap which overcomes the aforementioned drawbacks of the prior art covers.

The structure provided for accomplishing the desired results noted above includes a track section link comprising a pair of upright, laterally-spaced rails interconnected at respective first ends thereof by a sprocket-engaging member including a base portion in the form of a generally semi-cylindrical bar and a wear cap or cover of generally C-shaped cross section received on the bar. The wear cap has its opposite ends spaced apart so as to permit passage of the base portion only when the wear cap is placed in predetermined range of attitudes relative to the base portion. When the wear cap is installed, it is oriented so as to be out of said range of attitudes and it is kept in place by overlapping end portions respectively of a grouser removably secured to the link with which the sprocket-engaging member is associated and of a grouser forming part of an adjacent track section.

An object of the invention is to provide a track link having a sprocket-engaging portion provided with a wear cap or cover which may be easily removed without distorting the wear cap and without breaking the track sections apart, one from the other.

A more specific object is to provide a wear cap, as set forth in the previous object, which is held in place by adjacent grousers forming part of adjacent track sections and which may be easily rotated to an attitude for disengagement from a base portion, on which the wear cap is carried.

These and other objects will become apparent from a reading of the following description together with the appended drawings.

DESCRIPTION OF THE PREFERRED EMBODIMENT

Figure 1:
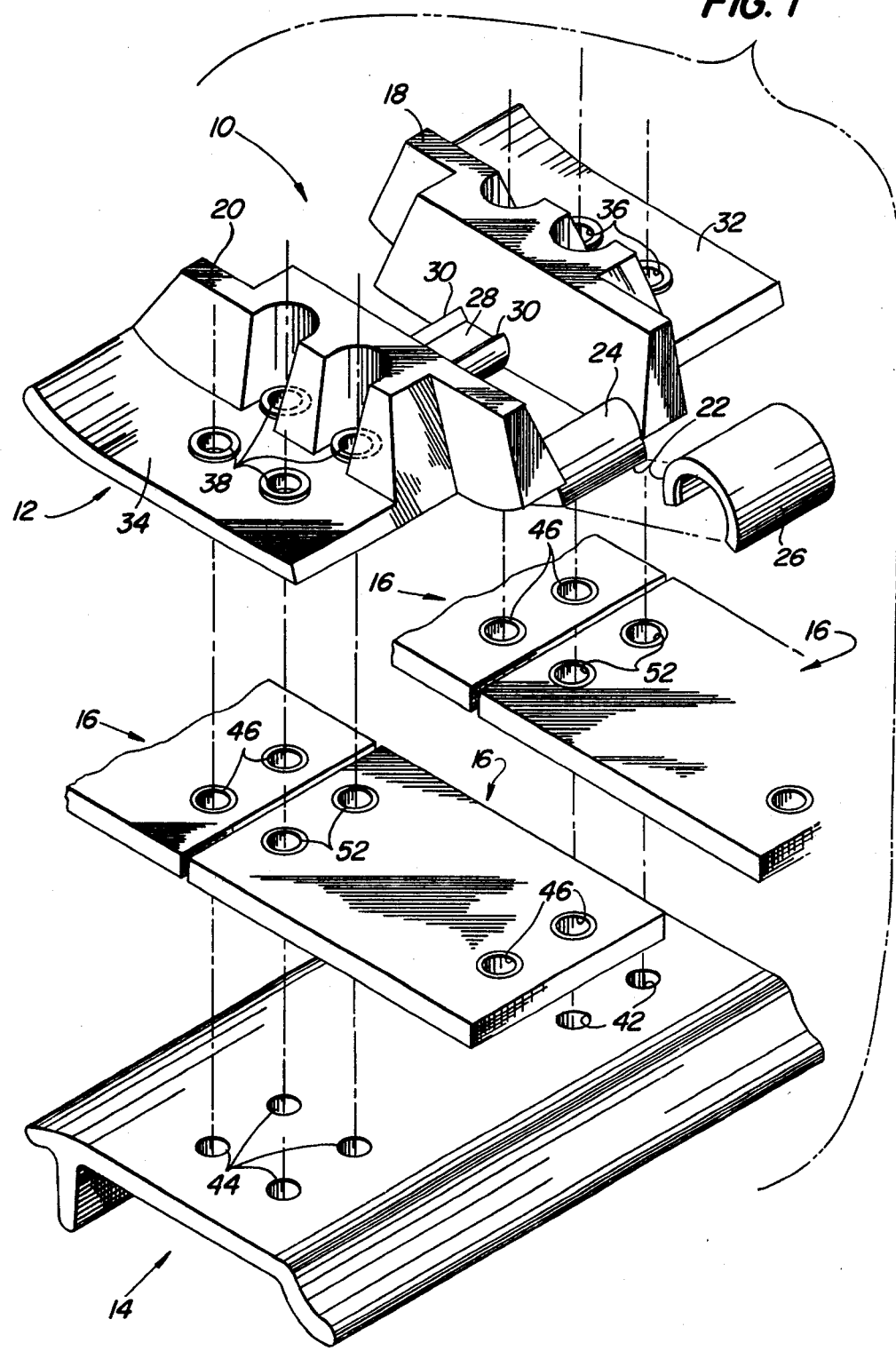
FIG. 1 is an exploded perspective view of a track link embodying a sprocket-engaging member constructed in accordance with the principles of the present invention.

Referring now to FIG. 1, therein is shown a track section 10 of a type adapted for interconnection with a plurality of like sections to form an endless drive track for a track-laying vehicle. The track section 10, as viewed in FIG. 1, includes a top defined by a track link 12, a bottom defined by a grouser 14, and a pair of side-by-side disposed, generally rectangular, resilient flexors 16 having respective first end portions sandwiched between the link and grouser.

The link 12 includes a pair of transversely-spaced, upright rail portions 18 and 20 joined at their rightward ends by a transverse sprocket-engaging portion 22 defined by a base 24 in the form of a transverse generally semi-cylindrical bar and by a wear cap 26 which is in the form of a cylindrical segment that is greater than semi-cylindrical and is embracingly received on and extends over the length of the base 24. The rail portions 18 are also joined at resepctive locations intermediate of their ends by a sprocket receptacle cleaning portion 28 defined by a transverse bar having cleaning ribs 30 running the length thereof. The upright rail portions 18 and 20 are respectively joined to horizontal plate portions 32 and 34 in which are respectively located two sets of four vertical mounting holes 36 and 38.

The grouser 14 includes a flat portion 40 extending beneath the plate portions 32 and 34 and provided with two sets of four vertical mounting holes 42 and 44 that are aligned with the sets of holes 36 and 38 provided in the link.

The flexors 16 each include a pair of mounting holes 46 in respective first end portions thereof, the holes 46 of one flexor being aligned with two each of the sets of holes 36 and 42, and the holes 46 of the other flexor being aligned with two each of the sets of holes 38 and 44. Mounting bolts 48 are received in the aligned holes and have nuts 50 tightened on their upper ends for clamping the link 12 and grouser 14 in sandwiching relationship to the flexors 16. The flexors 16 each have a pair of mounting holes 52 in respective second end portions thereof, these second end portions being clamped between the link and grouser of an adjacent track section 10, as can best be seen in FIG. 2.

Figure 2:
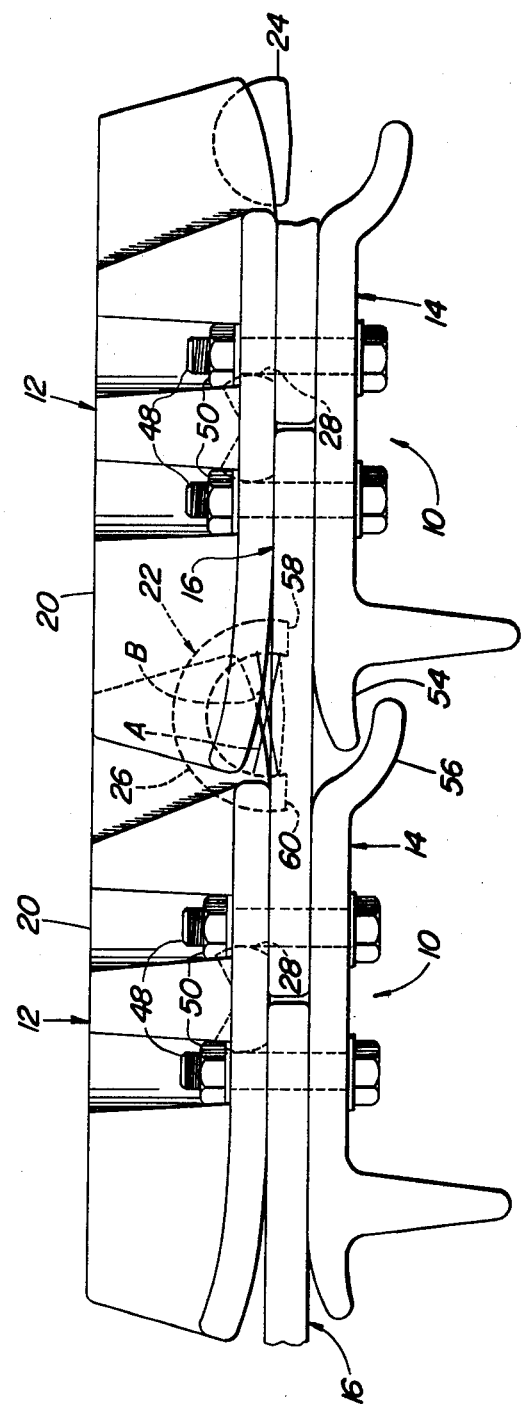
FIG. 2 is a side elevational view of adjacent rack sections and showing how the wear cap of the sprocket-engaging member is held in place.

Referring now to FIG. 2, it can be seen that the sprocket engaging portion 22 is located generally vertically above overlapped end portions 54 and 56, respectively, of the grousers 14 of the right- and left-most ones of the link sections 10. Further, it can be seen that the wear cap 26 has opposite, transversely-extending ends 58 and 60 respectively located adjacent to the end portions 54 and 56 so that movement of the wear cap one way or the other about the base 24 is limited.

In the embodiment illustrated the arcuate surface of the base 24 extends through an arc of about 250 degrees while the arcuate inner surface of the wear cap 26 extends through an arc of approximately 220 degrees. As will become apparent from the discussion below, the arcuate surface of the base 24 must be no less than 180 degrees and the arcuate inner surface of the wear cap 26 must exceed 180 degrees to operate properly. Lines A and B as applied to the end of the base 24 in FIG. 2 are diameters having respective first ends beginning at opposite ends of the arcuate surface of the base 24. It will be appreciated that there will be only a single diameter line if the base 24 were constructed to have an arcuate surface of only 180 degrees. The wear cap 26 will be locked on the base 24 as long as it is in a position on the base where the ends 58 and 60 are respectively below the points of intersection of the lines A and B with the arcuate surface of the base 24. The limitation of the movement of the wear cap 26 on the base 24 as afforded by the adjacent grousers 14 is such that the wear cap ends 58 and 60 are always respectively located below the lines A and B, and consequently, the wear cap 26 is maintained in place so long as the adjacent grousers are tightened in place. Once one or the other of the adjacent grousers 14 is loosened, as indicated by dashed lines, or removed, the wear cap 26 may be removed by first rotating it such that one or the other of the wear cap ends is located above the lines A or B and then by pivoting or shifting the wear cap to disengage it from the base 24. To ensure that the wear cap 26 can be disengaged from the base 24, the ends 58 and 60 of the wear cap should be spaced apart by a distance which is at least as great as the smallest cross-sectional dimension of the base 24, i.e., the height of the base.

Thus, it will be appreciated that the wear cap 26 is held in place by existing structure of the track section with which it is associated and existing structure of an adjacent track section and may be made of relatively thick material and replaced or reversed without necessitating the track sections 10 to be broken apart one from the other.

I claim:

1. A track section, adapted for interconnection with a plurality of like sections to form a track-laying vehicle endless track, comprising: a pair of transversely spaced, generally rectangular, resilient flexors, each flexor having first and second pairs of mounting holes respectively adjacent opposite ends thereof; a grouser and a link having opposed planar surfaces engaged with opposite surfaces of respective end portions of the flexors containing said first pairs of mounting holes and having respective third and fourth pairs of mounting holes aligned with each other and with the first pairs of mounting holes and having respective fifth and sixth pairs of mounting holes aligned with each other and adapted for alignment with respective second pairs of mounting holes of a flexor of an adjacent track section; first and second pairs of fasteners received in aligned mounting holes of the grouser, flexors and link and clamping the grouser and link in sandwiching relationship to the flexors; said link including a substantially semi-cylindrical bar located between the flexors, a generally C-shaped, sprocket-engaging wear cap received on the bar and having opposite, transversely-extending ends separated by a distance less than the diameter of said bar and at least as great as the smallest cross-sectional dimension of said bar whereby the bushing may be disengaged from the bar by rotating it to a disassembly position wherein it may be withdrawn over said smallest cross-sectional dimension of the bar; and said grouser having a surface disposed closely adjacent to one of the transversely-extending ends of the wear cap to prevent it from accidentally turning in a first direction to its disassembly position and the other of said transversely-extending ends of the wear cap being adapted for being disposed closely adjacent an end surface portion of an adjacent grouser to limit movement of the wear cap in a direction opposite from said first direction.

2. In a track link including a pair of transversely-spaced upright rail portions joined together by first and second transverse bars, the improvement comprising: said first transverse bar having an arcuate profile of at least 180 degrees and a height less than the diameter of the profile; an arcuate C-shaped wear cap of more than 180 degrees having opposite ends extending lengthwise thereof and defining an opening dimensioned greater than the height of the first transverse bar; and said wear cap being received on the bar.

* * * * *